| United States Patent [19] | [11] Patent Number: 4,828,883 |
| Ramun | [45] Date of Patent: May 9, 1989 |

[54] ASBESTOS CONTAMINATION CONTROL METHOD AND FORMULAS USED THEREIN

[75] Inventor: John R. Ramun, Youngstown, Ohio

[73] Assignee: Allied Gator, Inc., Youngstown, Ohio

[21] Appl. No.: 41,200

[22] Filed: Apr. 22, 1987

[51] Int. Cl.$^4$ .................. B05D 7/00; B29C 67/00; C08K 3/00; B32B 19/04

[52] U.S. Cl. ............................ 427/214; 264/117; 427/221; 428/443; 524/5; 524/388

[58] Field of Search ............ 264/117, 109, 122; 524/5, 388; 427/214, 221; 428/404, 407, 443

[56] References Cited

U.S. PATENT DOCUMENTS

| 3,972,972 | 8/1976 | Yano et al. | 264/117 |
| 4,271,115 | 6/1981 | Georgeau | 264/117 |
| 4,489,109 | 12/1984 | Puskar | 427/230 |
| 4,604,111 | 8/1986 | Natale | 55/97 |

*Primary Examiner*—Michael Lusignan
*Attorney, Agent, or Firm*—Harpman & Harpman

[57] ABSTRACT

A method and material for protection from airborne asbestos and other particular contamination is disclosed that is useful for protecting the environment and individuals working therein as occurs at a job site when friable or cementitious asbestos containing coatings are being removed from existing structures. The method includes application of a combined wetting and encapsulation formula which bonds the asbestos fibers to materials in the formula so as to convert friable asbestos to non-friable asbestos and a hardening procedure and formula which places the bonded non-friable asbestos in a hardened mass so that it may be safely disposed of.

18 Claims, No Drawings

ASBESTOS CONTAMINATION CONTROL METHOD AND FORMULAS USED THEREIN

BACKGROUND OF THE INVENTION

1. Technical Field

This invention relates to a method of asbestos contamination control and the formulas used therein and the use of the method on friable or cementitious asbestos containing coatings or articles that are being removed from a building being renovated or demolished.

2. Description of the Prior Art

U.S. Pat. No. 3,972,972 discloses a process for producing a board of cement-like material reinforced by fibrous material, such as asbestos, wherein the fibrous material is airborne during the formation of the material.

U.S. Pat. No. 4,271,115 discloses a method of producing a prewet dust-free form of asbestos short fibers by agglomerating the asbestos fibers with a relatively small amount of hydrophilic liquids such as water and a polymeric material such as ethylene glycol. The asbestos agglomerate is designed for use in connection with non-polar materials such as solvents, oils, rubber, polyethylene, and polyesters.

U.S. Pat. No. 4,489,109 discloses a process for the production of a vulcanized latex protective coating bonded to the surface of an asbestos-cement article to prevent the subsequent release of asbestos fibers from the same.

U.S. Pat. No. 4,604,111 discloses a negative air pressure method and apparatus for the protection of a job site from airborne asbestos fibers in a specified enclosure defining the job site.

The present invention differs from the known prior art in avoiding the release of friable asbestos into the environment by an initial step of wetting the asbestos containing material and simultaneously encapsulating the asbestos fibers in the material thus preventing the release of friable asbestos into the environment whereas the prior art relates to utilizing friable asbestos in a product where the friable asbestos is airborne during some or all of the stated process or in the case of U.S. Pat. No. 4,604,111, friable asbestos in the environment is airborne and is theoretically circulated through filters in communication with an exhaust means.

The United States Environmental Protection Agency has established regulations setting certain standards for the handling of friable asbestos in various work environments including demolition. The demolition of structures containing friable asbestos is controlled by these regulations and requires very expensive handling and disposal techniques. The disposal techniques for friable asbestos are particularly burdensome and expensive including wetting, double bagging, and disposal in only certain licensed disposal sites which are often a great distance from a demolition site.

SUMMARY OF THE INVENTION

The present invention is directed to a method of converting friable asbestos in insulating coatings and coverings to non-friable asbestos and is particularly useful in protecting the environment from contamination with friable asbestos when asbestos containing insulating coatings, coverings and similar forms are being removed and/or the structures in which they are located demolished. The method of the present invention comprises converting friable asbestos to non-friable asbestos by wetting and encapsulating the asbestos and/or asbestos containing material with water containing propylene glycol, vinyl acetate/ethylene copolymer and preferably a dye to indicate satuation and depth of penetration of the wetting liquid in the material which can then be safely removed and following such removal further encapsulating the asbestos with an additional treatment of the same material.

The removed material including the encapsulated asbestos is then mixed with a hardening formula of water, Portland cement, and a small amount of propylene glycol so as to form a pourable mixture that will harden and form a mass completely and safely containing the non-friable asbestos. The propylene glycol acts to bond the larger molecules of the water, vinyl acetate/ethylene copolymer and Portland cement to the asbestos fibers to a much greater extent than has heretofore been believed possible.

DESCRIPTION OF THE PREFERRED EMBODIMENT

As used throughout this specification, the term friable asbestos means any material containing asbestos that by hand pressure can crumble, pulverize, or be reduced to powder-like fibers which can be airborne. The term asbestos means any of the asbestiform varities of chrysotile, crocidolite, cummingtonite-grunerite, anthophoyllite, and actinolite-tremolite. The herein disclosed method and formulas for converting friable asbestos to non-friable asbestos have many advantages in both eliminating a potential health hazard and in greatly reducing the cost and difficulties of disposing of friable asbestos in accordance with the National Emission Standards for Hazardous Air Pollutants (49 Federal Register, page 13658 et seq.). The wetting and encapsulation formula may comprise for example 93.88% by volume water, 0.015% by volume propylene glycol, 6.09% by volume vinyl acetate/ethylene copolymer, 0.0003% by volume F,D and C Blue No. 1, and 0.0007% by volume F,D and C Yellow No. 5 to obtain the color green in the formula. The final hardening formula may comprise 75.46% by volume, water, 0.011% by volume propylene glycol, and 24.53% by volume Portland cement. Vinyl acetate/ethylene copolymer may be substituted for the Portland cement. The color dyes above referred to may be added to the hardening formula if desired. The quantity of asbestos fibers in different articles varies and an improved formula of the wetting and encapsulation formula can be obtained by increasing the vinyl acetate/ethylene copolymer to 11.49% by volume with a similar increase of the propylene glycol and reducing the water content to 88.50% by volume. The hardening or solidifying formula may comprise from about 67.42% by volume to about 75.46% by volume water, from about 0.011% to about 0.02% by volume propylene glycol, and from about 24.53% to about 29.50% by volume Portland cement and an equal amount of vinyl acetate/ethylene copolymer may be substituted for the Portland cement. The wetting and encapsulation formula may comprise from about 60% by volume to about 99% by volume water, from about 0.011% to about 0.02% by volume propylene glycol, and from about 6.9% to about 7.81% by volume vinyl acetate/ethylene copolymer. The vinyl acetate/ethylene copolymer is a water soluble, dry white powder commerically available as AIRFLEX RP 226, a product of Air Products and Chemicals, Inc. of Allentown, Pa.

A still further improved wetting and encapsulation formula can be obtained by additionally increasing the content of vinyl acetate/ethylene copolymer to 17.4% by volume with a similar increase of the propylene glycol and reducing the water content to 82.6% by volume.

Flame retardants may and should be added to above formulas and may comprise 75 to 150 grams of ammonium polyphosphate for each gallon of the wetting and encapsulation formula or alternately from 12 to 20 ounces of liquid sodium silicate grade 40 added to each gallon of the wetting and encapsulation formula.

Those skilled in the art will observe that the application of the above formulas in the hereindisclosed method may be quickly performed and that the materials used in the formulas are relatively inexpensive as the asbestos and/or asbestos containing material to be removed is simply sprayed or otherwise wet with the wetting and encapsulation formula above described so that the asbestos and/or asbestos containing material is sufficiently saturated and/or penetrated as may be visibly determined by the color thereof. The asbestos material is then removed and further encapsulated by mixing by mixing with the hardening formula including the Portland cement so as to completely enclose and bond the asbestos containing material rendering it safe for disposal as all of the asbestos and the particles of other materials, such as binders, are advantageously bonded in a solid mass by the hardening formula hereinbefore given.

It will thus be seen that the asbestos and/or asbestos containing material, such as insulation, may be quickly and safely removed from an article or structure without enclosing the area or otherwise attempting to control air quality in the removal area.

It will also be observed that there can be no air contamination as no friable asbestos is present in the material being removed.

A modification of the wetting and encapsulation formulas hereinbefore given may be employed wherein Portland cement is substituted for the vinyl acetate-/ethylene copolymer of the earlier examples. One such generally satisfactory mixture comprises water 75.46% by volume, Portland cement 24.53% by volume and propylene glycol 0.011% by volume in which mixture the amount of water may be varied depending upon a desired consistency. The propylene glycol bonds the larger molecules of the Portland cement to the smaller molecules of the asbestos fibers.

The hardening formula with the Portland cement may be used by mixing the wetted and encapsulated asbestos containing material in a ratio of 7 parts by volume to one part by volume of the Portland cement containing hardening formula. The ratio may change depending on the asbestos containing material composition from 2 to 14 parts by volume to 1 part of the Portland cement containing hardening formula. The resulting mix which contains no friable asbestos will harden into a solidified mass which may be safely and easily disposed of in any landfill or the like.

It will occur to those skilled in the art that when the resulting mass has dried and hardened, the same may be sprayed with the wetting and encapsulating formula hereinbefore disclosed if desired to additionally coat and seal the mass before final disposal.

A further modification of the wetting and encapsulating formulas may comprise water 67.72% by volume, Portland cement 29.34% by volume, vinyl acetate-/ethylene copolymer 2.93% by volume, and propylene glycol 0.0062% by volume.

A still further modification may comprise water 95.83% by volume, vinyl acetate/ethylene copolymer 4.15% by volume, and propylene glycol 0.0152% by volume.

It will occur to those skilled in the art that the several formulas hereinbefore set forth may be adapted for use in lower temperature or winter removal operations to prevent freezing by increasing the percentage ratio of propylene glycol to that of water, propylene glycol is 1,2-propanediol sometimes known as 1,2-dihydroxypropane.

Numerous tests of the wetting and encapsulation material formulas hereinbefore given have been made with test samples formulated as follows. One wetting and encapsulation formula sample comprises 38 ounces of water and 0.187 grams of propylene glycol with the addition of saturation and penetration indicating dye comprising 0.013 grams of F,D, and C Blue No. 1 and 0.027 grams of F,D, and C Yellow No. 5 to obtain the color green. The wetting and encapsulation formula sprayed or similarly applied on asbestos containing material penetrates the same rapidly and to a depth of four inches in approximately one hour's time. The degree of penetration and/or saturation is visible due to the color occasioned by the dye in the formula. Removing the treated asbestos containing material such as insulation from an object is facilitated by the freeing of the bonding agents by the wetting and encapsulation formula and disclose no friable asbestos or other material capable of being airborne. The wetting and encapsulation (bonding) softening action is maintained for a number of hours (from 6 to 12 hours) and may be repeated in the event the time element is extended and some drying of the asbestos containing material occurs before removal. The bonding of the removed asbestos containing material with the hardening formulas hereinbefore given insures the stability of the removed material and the continued absence of friable asbestos.

It has been found that an acceptable modified wetting and encapsulation formula can be formed by subsituting an acrylic polymer such as commercially available from Rohm and Haas Company of Philadelphia, Pa. 19105, as RHOPLEX MC 76 Emulsion (an aqueous acrylic emulsion) for the vinyl acetate/ethylene copolymer of the formulas hereinbefore disclosed and adding Portland cement. For example, the wetting and encapsulation formula may comprise substantially 67.65% by volume water, 0.00076% by volume propylene glycol, 7.81% by volume acrylic polymer, and 24.53% by volume Portland cement, and 0.00038% by volume F,D, and C Blue No. 1 and 0.00076% by volume F,D, and C Yellow No. 5 to obtain the color green. The acrylic polymer is an emulsion of 47% acrylic polymer solids and water.

Several embodiments of the present invention have been described and it will be apparent that various changes and modifications of the initial step wetting and encapsulation formula and the hardening formula may be made without departing from the scope of the invention and having thus described my invention what I claim is:

1. A method of removing dangerous asbestos containing materials from a first location and controlling environmental contamination therefrom comprising the steps of wetting and encapsulating said dangerous materials in said first location with a wetting formula comprising from about 60% to about 99% by volume water, from about 0.011% to about 0.02% by volume propylene glycol and from about 6.09% to about 17.04% by volume vinyl acetate/ethylene copolymer in an amount sufficient to penetrate said dangerous material, removing said wetted encapsulated materials from said first location to a second location, mixing said removed materials with a hardening formula comprising from about 67.72% to about 94% by volume water, from about 24% to about 29.34% by volume of one of a group comprising Portland cement and vinyl acetate/ethylene copolymer and from about 0.0062% to about 0.011% by volume propylene glycol whereby said wetting and encapsulating formula initially renders said dangerous asbestos containing material non-friable and said hardening formula solidifies and permanently holds said dangerous material in a non-friable safely disposable solid mass.

2. The method of claim 1 wherein said dangerous materials include friable asbestos.

3. The method of claim 1 wherein said dangerous materials comprise asbestos containing insulation on pipes and the like.

4. The method of claim 1 wherein said dangerous materials comprise asbestos containing thermal insulation bats.

5. The method of claim 1 wherein the amount of said wetting and encapsulation formula is sufficient to saturate the asbestos containing materials.

6. The method of claim 1 wherein dye is present in said wetting and encapsulation formula in an amount sufficient to render said formula visible in said asbestos containing materials.

7. The method of claim 1 wherein said wetting and encapsulation formula comprises water 93.88% by volume, propylene glycol 0.015% by volume, and vinyl acetate/ethylene copolymer 6.9% by volume.

8. The method of claim 1 wherein said hardening formula comprises 75.46% water by volume, 24.53% Portland cement by volume, and 0.011% propylene glycol by volume.

9. A method of removing dangerous asbestos containing materials from a first location and controlling environmental contamination therefrom comprising the steps of wetting and encapsulating said dangerous asbestos containing materials in said first location with a wetting and encapsulation forming comprising water 93.88% by volume, propylene glycol 0.015% by volume and vinyl acetate/ethylene copolymer 6.09% by volume in an amount sufficient to saturate said dangerous asbestos containing material, removing said dangerous asbestos containing material from said first location to a second location, mixing said removed materials with a solidifying formula comprising water about 75.45% by volume, vinyl acetate/ethylene copolymer about 24.53% by volume and propylene glycol about 0.011% by volume whereby said wetting and encapsulation formula renders asbestos in said dangerous asbestos containing materials non-friable and said solidifying formula permanently holds said dangerous asbestos containing materials in a non-friable safely disposable solid mass.

10. A method of removing dangeous asbestos containing materials from a first location and controlling environmental contamination therefrom comprising the steps of wetting and encapsulating said dangerous materials in said first location with a wetting and encapsulating formula comprising water 67.65% by volume, propylene glycol 0.00076% by volume and 7.81% by volume of an aqueous acrylic emulsion of acrylic polymer having 47% acrylic polymer solids in an amount sufficient to saturate said dangerous materials, removing said wetted dangerous materials from said first location to a second location, saturating said removed dangerous materials with a hardening formula comprising water 75.46% by volume, Portland cement 24.53% by volume, and propylene glycol 0.011% by volume whereby said wetting and encapsulation formula renders asbestos in said dangerous materials non-friable and said hardening formula permanently holds said dangerous materials in a non-friable safely disposable solid mass.

11. A method of removing dangerous asbestos containing materials from a first location and controlling environmental contamination therefrom comprising the steps of wetting and encapsulating said dangerous materials in said first location with a wetting and encapsulating formula comprising water 93.88% by volume, propylene glycol 0.015% by volume and vinyl acetate/ethylene copolymer 6.09% by volume in an amount sufficient to saturate said dangerous materials, removing said wetted dangerous materials from said first location to a second location, mixing said removed dangerous materials with a hardening formula comprising water 75.45% by volume, Portland cement 24.53% by volume, and propylene glycol 0.011% by volume whereby said wetting and encapsulation formula renders asbestos in said dangerous materials non-friable and said hardening formula permanently holds said asbestos in said materials in a non-friable safely disposable solidifed mass.

12. A method of removing dangerous asbestos materials from a first location and controlling environmental contamination therefrom comprising the steps of wetting and encapsulating said dangerous materials in said first location with a wetting formula comprising water 75.46% by volume, propylene glycol 0.011% by volume, and Portland cement 24.53% by volume in an amount sufficient to saturate said dangerous materials, removing said wetted and encapsulated dangerous materials from said first location to a second location and mixing said removed dangerous materials with a hardening formula comprising water about 75.45% by volume, vinyl acetate/ethylene copolymer about 24.53% by volume, and propylene glycol about 0.011% by volume whereby said wetting and encapsulation formula renders said asbestos in said dangerous materials non-friable and said hardening formula permanent holds said dangerous solid materials in a non-friable safely disposable solidified condition.

13. A method of removing dangerous asbestos containing materials from a first location and controlling environmental contamination therefrom comprising the steps of wetting and encapsulating said dangerous materials in said first location with a wetting and encapsulation formula comprising from 60% to 99% by volume water, from 0.011% to 0.02% by volume propylene glycol and from 6.9% to 7.81% vinyl acetate/ethylene copolymer in an amount sufficient to penetrate and saturate said dangerous materials, removing said wetted and encapsulated materials from said first location to a second location and mixing said removed wetted and encapsulated materials with a hardening formula comprising from 75% to 94% by volume water, from 24% to 29.50% by volume Portland cement and from 0.0062% to 0.001% by volume propylene glycol whereby said wetting and encapsulation formula renders said asbestos in said dangerous materials non-friable and said hardening formula permanently holds said dangerous materials in a solid non-friable safely disposable mass.

14. The method of removing dangerous asbestos containing materials from a first location and controlling environmental contamination therefrom comprising the steps of saturating said dangerous materials in said first location with a wetting formula compising from 60% to 95% by volume water, from 0.016% to 0.02% by volume propylene glycol, from 24.50% to 29.34% by volume Portland cement in an amount sufficient to penetrate and saturate said asbestos containing materials, removing said wetted materials from said first location to a second location, mixing said removed materials with a hardening formula comprising from 67.72% to 94% by volume water, from 6.09% to 17.50% by volume vinyl acetate/ethylene copolymer, and from 0.0128% to 0.012% by volume propylene glycol whereby said wetting formula renders said asbestos in said materials non-friable and said hardening formula permanently holds said asbestos containing materials in a non-friable safely disposable mass.

15. The method of removing dangerous asbestos containing materials from a fixed location in a job site so as to avoid airborne asbestos fibers comprising the sequential steps of wetting said materials with a first formula comprising from 60% to 99% by volume water, from 0.011% to 0.02% by volume propylene glycol, and from 6.9% to 7.81% by volume acrylic polymer in an amount sufficient to penetrate and saturate said asbestos containing materials, removing said wetted materials from said fixed location, mixing said removed wetted materials with a second formula comprising from 75% to 94% by volume water, from 24% to 29.50% by volume Portland cement, and from 0.0062% to 0.011% by volume propylene glycol so that said formulas join the molecules of said asbestos to the molecules of said acrylic polymer and Portland cement to render said asbestos non-friable.

16. A formula for treating dangerous asbestos fiber containing materials so as to render said asbestos fibers non-friable, said formula comprising from 60% to 99% by volume water, from 0.011% to 0.02% by volume propylene glycol and from 6.9% to 7.81% by volume vinyl acetate/ethylene copolymer wherein said propylene glycol acts to bond the larger molecules of said vinyl acetate/ethylene copolymer to the smaller molecules of said asbestos fibers.

17. A formula for treating dangerous asbestos fiber containing materials so as to render said asbestos fibers non-friable, said formula comprising from 60% to 99% by volume water, from 0.011% to 0.02% by volume propylene glycol and from 6.9% to 7.81% by volume acrylic polymer wherein said propylene glycol acts to bond the larger molecules of said acrylic polymer to the smaller molecules of said asbestos fibers.

18. A formula for treating dangerous asbestos fiber containing materials so as to render said asbestos fibers non-friable, said formula comprising from 60% to 95% by volume water, from 0.016% to 0.02% by volume propylene glycol, from 24.50% to 29.34% by volume Portland cement wherein said propylene glycol acts to bond the larger molecules of said Portland cement to the smaller molecules of said asbestos fibers.

* * * * *